Patented Dec. 17, 1940

2,225,570

UNITED STATES PATENT OFFICE 2,225,570

ASPHALTIC BITUMEN

Johan Philip Pfeiffer, Amsterdam, Netherlands, assignor to Shell Development Company, San Francisco, Calif., a corporation of Delaware No Drawing. Application October 2, 1939, Serial No. 297,566. In the Netherlands October 7, 1938

11 Claims. (Cl. 106—31)

This invention relates to a process for the treatment of bituminous substances or compositions containing these substances, comprising all sorts of asphaltic bitumen, particularly mineral oil distillation residues, steam-refined bitumen, residues from the extraction of mineral oils or fractions thereof with low-molecular hydrocarbons or other solvents, such as the so-called propane asphalts, mineral oil cracking residues, bitumens obtained from waste products of the refining of mineral oils, such as those prepared from acid sludge or from extracts from oils, treated with selective solvents, blown, sulfurized or chlorinated asphaltic bitumens, natural asphalts, such as Trinidad asphalt and gilsonite, bituminous shale, bituminous sand, various tars and pitches, such as coal-tar pitch and the like. These bituminous substances may, among other things, be applied in mixtures with mineral or organic substances, e. g. in bitumen solutions, bituminous oils, particularly road oils, bitumen dispersions, bituminous paints and the like.

According to the present invention, bituminous substances, or compositions containing these substances are manufactured with improved properties in regard to their adhesive and spreading properties, and particularly in the presence of water or moisture, on stones, mineral aggregates and other materials of various nature.

The process according to the present invention consists of adding to bituminous substances or compositions containing these substances small quantities of sulfuric acid esters or aryl sulfonic acid esters of lower primary aliphatic alcohols, or substances capable of yielding these esters. Such substances can be represented by the formula

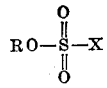

in which R is a primary alkyl group and X is a hydroxyl group or a primary alkoxy or aryl radical. These are referred to as sulfo compounds in the appended claims. By lower alcohols is meant those alcohols having not more than 8 carbon atoms.

Examples of esters which come into consideration are: dimethyl sulfate, methyl ethyl sulfate, diethyl sulfate, di-n-propyl sulfate, ethyl acid sulfate, the methyl ester of benzene sulfonic acid, the dimethyl ester of benzene disulfonic acid, the ethyl ester of paratoluene sulfonic acid, and the like.

An example of a combined application of substances which may yield a suitable ester is a mixture of methyl alcohol and sulfuric acid.

In most cases the object of the treatment according to the invention can be achieved by adding less than 1% or a few per cent. of the respective esters, calculated by weight of the bituminous substance treated, although in some cases, depending on the purpose aimed at and the nature of the bituminous material, larger quantities of the esters may be added.

The treatment of the bituminous substances or the compositions containing these substances may in some cases be carried out at ordinary temperature. It is generally preferably to add the esters to the bituminous substances at an elevated temperature, e. g. of the order of 100° C. or higher. It is not ordinarily desirable to elevate the temperature to over 150° C.

The treating time required for effecting a thorough incorporation of the esters into the bituminous material depends on the treating temperature. Whereas treatment at ordinary or moderately raised temperature may necessitate mixing for some hours, only a quarter of an hour's mixing will often be sufficient when operating at about 100° C. Naturally the treating temperature as well as the treating time depend also on the nature of the ester and of the bituminous materials.

The esters or the substances capable of yielding the esters can be added as such or in the form of solutions in suitable solvents.

The bituminous substances, or compositions containing these substances, treated according to the invention may be applied for various purposes. They may, inter alia, be used in road construction, in particular as bituminous oils or cutbacks, for coating or enveloping natural or artificial mineral aggregates and concrete, for hydraulic constructions, for impregnating fibrous materials, such as fabrics, wood, paper and cardboard, for coating metals, pipelinings, anti-corrosive paints, joint fillings, etc. They may also serve as intermediate layers or adhesives in applying asphalt, asphaltic bitumen or other substances, such as rubber or wood, to materials of the most widely divergent nature.

The importance of the process according to the present invention is manifested in particular by the fact that the bituminous substances treated may be readily applied to materials or articles which have not been previously dried, whilst working in damp weather does not involve the risk of insufficient adhesion or an incomplete coating; moreover, no loosening of the coating occurs in case of a subsequent moistening of these materials or articles.

The bituminous substances treated according to the invention readily adhere to the so-called hydrophilic stones, that is in particular stones of acid character, such as quartz and granite, which it is in general very difficult to coat perfectly with the untreated bituminous materials.

*Example I*

0.2% dimethyl sulfate was added to an asphaltic bitumen derived from an Iraq mineral oil (pen. 25=183, melting point R. & B.=40° C., penetration index=—0.3) at about 80° C., and the mass was thoroughly mixed. After mixing for about 10 minutes 12% kerosene was added, thereby producing a thick oil. This oil, after heating to about 100° C., was used for coating granite chippings in the manner usual in road construction. When the aggregate thus coated was immersed in water at 40° C., the coating remained unaffected.

If the same bitumen, without addition of dimethyl sulfate or another ester of the above kind, is diluted with kerosene, the granite chippings are coated with this oil in the same manner as described above and the aggregate thus coated is immersed in water, the bituminous oil slowly recedes from the surface of the stone, so that after only a few hours a large part of the surface is bared.

*Example II*

To a bituminous oil, prepared by mixing 60 parts by weight of blown asphaltic bitumen (pen. 25=37, melting point R. & B.=83° C., penetration index=+4) with 40 parts by weight of solvent naphtha, were added 0.5% methyl alcohol and 0.4% concentrated sulfuric acid, and the mass was thoroughly mixed for one hour at about 100–130° C. The product thus obtained was spread in a thin layer on concrete, and this layer was allowed to dry at normal temperature. Subsequently a covering layer of about 3 mm. thickness was applied, consisting of the above-mentioned asphaltic bitumen heated to about 180° C. The adhesion of this bituminous layer to the concrete was not impaired upon contact with water.

*Example III*

2% by weight dimethyl sulfate was added at about 100° C. to a Venezuelan asphaltic bitumen (pen. 25=23, melting point R. & B.=61° C., penetration index=—0.4); the mixture was then thoroughly stirred for about one hour and the product obtained was mixed in the ratio 15:85 parts by weight with a Venezuelan high-vacuum asphaltic bitumen (pen. 25=6, melting point R. & B.=96°, penetration index=+2.0); thereupon an equal quantity by weight of terpentina was added and the product was mixed again. The product obtained was subsequently brushed out on a sand-blasted iron plate. The coat of paint thus produced was left to flow for another 5 minutes, whereupon the painted plate was placed in water. After one day practically no iron had become exposed. When the same experiment was carried out without the addition of dimethyl sulfate a considerable part of the paint coating was found to have been removed by the water after one day.

When wet iron plates were painted until a complete covering had been obtained, the difference between treated and non-treated bitumen was even considerably greater. The coating which contained bitumen treated with dimethyl sulfate was almost intact after 2 hours and was removed from only part of the surface after a relatively long period, say one day, whereas the coating which contained non-treated bitumen was practically entirely removed after a few minutes.

I claim as my invention:

1. The process of improving the adhesive properties of an asphaltic bitumen comprising combining the bitumen with a small amount of a sulfo compound having the formula

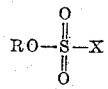

in which R is a primary alkyl group having 8 or less carbon atoms and X is a radical of the class consisting of the hydroxyl group and of the primary alkoxy and aryl radicals having 8 or less carbon atoms.

2. The process of claim 1 in which the asphaltic bitumen is mixed with the sulfo compound at a temperature of about 100° C.

3. The process of claim 1 in which about 1% of the sulfo compound is used.

4. The process of claim 1 in which the sulfo compound is an acid sulfuric acid ester of a lower primary alcohol.

5. The process of claim 1 in which the sulfo compound is a mixed sulfuric acid ester of lower aliphatic alcohols.

6. The process of claim 1 in which the sulfo compound is dimethyl sulfate.

7. The process of claim 1 in which the sulfo compound is methyl ethyl sulfate.

8. The process of claim 1 in which the sulfo compound is an aryl sulfonic acid ester of a lower primary alcohol.

9. The process of claim 1 in which the sulfo compound is a methyl ester of a benzene sulfonic acid.

10. The process of improving the adhesive properties of an asphaltic bitumen comprising adding a lower aliphatic alcohol and sulfuric acid thereto under conditions that will result in the sulfation of the alcohol.

11. As a new product an asphaltic bitumen containing a small amount of a sulfo compound of the formula

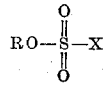

in which R is a primary alkyl group having 8 or less carbon atoms and X is an organic radical having 8 or less carbon atoms of the class consisting of primary alkoxy and aryl radicals.

JOHAN PHILIP PFEIFFER.